(12) United States Patent
Tijerina et al.

(10) Patent No.: US 12,744,848 B1
(45) Date of Patent: Sep. 22, 2026

(54) LIFECYCLE MANAGEMENT FOR PROGRESSING USER INTERACTIONS VIA LIVE AGENT AND SMART DIGITAL AGENT

(71) Applicant: UIPCO, LLC, San Antonio, TX (US)

(72) Inventors: Oscar Roberto Tijerina, San Antonio, TX (US); Edward Manuel Alonzo, III, San Antonio, TX (US); Daniel Nathan Kalinoski, San Antonio, TX (US); Keegan Patrick Hayes, Whitestown, IN (US); Octavia Lloyd, Riverview, FL (US); Oscar Guerra, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 108 days.

(21) Appl. No.: 18/954,297

(22) Filed: Nov. 20, 2024

Related U.S. Application Data

(60) Provisional application No. 63/601,561, filed on Nov. 21, 2023.

(51) Int. Cl.
*H04M 3/51* (2006.01)
*G10L 15/183* (2013.01)
*G10L 15/22* (2006.01)
*G10L 15/30* (2013.01)
*H04L 51/02* (2022.01)

(52) U.S. Cl.
CPC ......... *H04M 3/5191* (2013.01); *G10L 15/183* (2013.01); *G10L 15/22* (2013.01); *G10L 15/30* (2013.01); *H04M 3/5175* (2013.01); *H04L 51/02* (2013.01); *H04M 2201/39* (2013.01); *H04M 2201/40* (2013.01)

(58) Field of Classification Search
CPC .......................... H04M 3/5191; H04M 3/5175
USPC ........................................... 379/88.1, 265.01
See application file for complete search history.

(56) References Cited

U.S. PATENT DOCUMENTS 7,027,586 B2 * 4/2006 Bushey ............... H04M 3/5191 379/265.09
11,005,997 B1 * 5/2021 Deegan ................... G06F 40/35
11,425,215 B1 * 8/2022 Lewis ..................... H04L 67/63
(Continued)

*Primary Examiner* — Ahmad F. Matar
(74) *Attorney, Agent, or Firm* — Potomac Law Group, PLLC; Dannon G. Allbee

(57) ABSTRACT

Aspects of the present disclosure are directed to configuring smart digital agents for interactions over a user interaction lifecycle. Organizations that provide users services can interact with these users over a variety of interactions channels. For example, audio sessions can be initiated between the users and agents of the service provider. Smart digital agents can interact with users to perform the users' requested functionality or otherwise accomplish tasks. However, at times user interactions can face challenges, for example due to a mismatch in the capabilities of the digital agent and the requirements of the user. Implementations configure smart digital agents for interactions over a user interaction lifecycle. A live agent can select the smart digital agent(s) for user interactions, select predefined workflow(s) for the interactions, and provide live agent controls that further configure the selected smart digital agent(s) in a manner that tailors functionality to the user's issue(s).

20 Claims, 8 Drawing Sheets

(56) References Cited

U.S. PATENT DOCUMENTS

| | | | | |
|---|---|---|---|---|
| 11,641,384 | B1 * | 5/2023 | Lee | H04L 51/046 709/204 |
| 12,499,887 | B2 | 12/2025 | Vergyri et al. | |
| 2005/0203782 | A1 * | 9/2005 | Smith | H04M 3/493 705/5 |
| 2018/0376002 | A1 | 12/2018 | Abraham | |
| 2023/0199116 | A1 * | 6/2023 | Koneru | G06F 40/35 379/88.01 |
| 2023/0244968 | A1 | 8/2023 | Gurin et al. | |

* cited by examiner

LIFECYCLE MANAGEMENT FOR PROGRESSING USER INTERACTIONS VIA LIVE AGENT AND SMART DIGITAL AGENT

CROSS-REFERENCE TO RELATED APPLICATIONS

This application claims priority to U.S. Patent Provisional Application No. 63/601,561, titled “Lifecycle Management for Progressing User Interactions via Live Agent and Smart Digital Agent,” filed on Nov. 21, 2023, which is herein incorporated by reference in its entirety.

TECHNICAL FIELD

The present disclosure is directed to configuring smart digital agent(s) for interactions over a user interaction lifecycle.

BACKGROUND

Users can interact with a service provider via a variety of different channels. For example, users can hold audio calls with digital agents, audio calls with live agents, chat sessions, or simply perform a series of electronic actions to accomplish a task. The channels that users choose to leverage to interact with service providers can have a large impact on how these service providers deploy and/or utilize systems resources. For example, some interaction channels can consume a larger quantity of resources than others. Further, when user selections create an imbalance or otherwise overload a given interaction channel, the users' experience with these services providers can be negatively impacted. Systems that effectively deploy resources to implement interactions channels and/or transition among interactions channels can improve this user experience.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
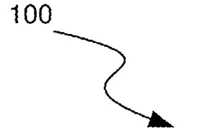
FIG. 1 is a block diagram illustrating an overview of devices on which some implementations can operate.
Figure 1:
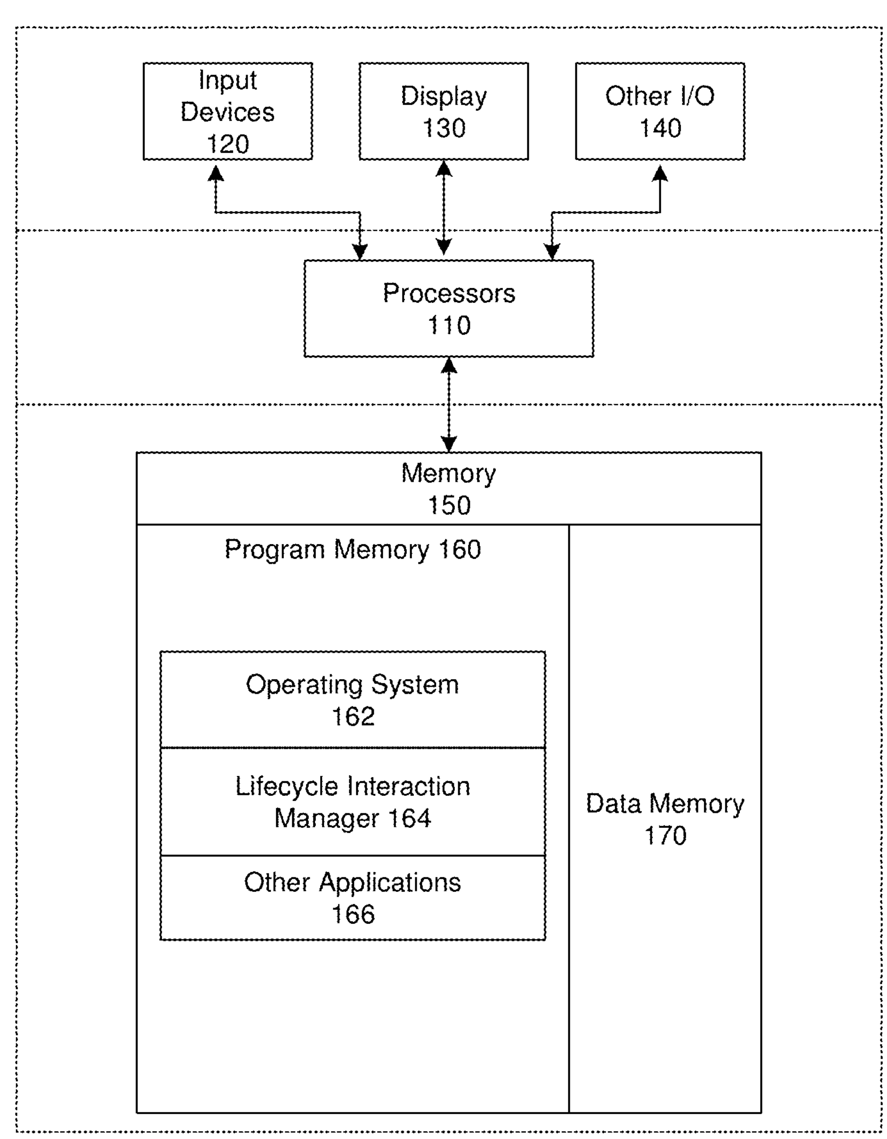

Aspects of the present disclosure are directed to configuring smart digital agents for interactions over a user interaction lifecycle. Organizations that provide users services can interact with these users over a variety of interactions channels. For example, audio sessions (e.g., telephone calls, real-time communication session comprising audio, etc.) can be initiated between the users and agents of the service provider. Smart digital agents can interact with users to perform the users' requested functionality or otherwise accomplish tasks for the users. However, at times user interactions can face challenges, for example due to a mismatch in the capabilities of the digital agent and the requirements of the user. Implementations configure smart digital agents for interactions over a user interaction lifecycle. For example, a live agent can select the smart digital agent(s) for user interactions, select predefined workflow(s) for the interactions, and provide live agent controls that further configure the selected smart digital agent(s) in a manner that tailors functionality to the user's issue(s).

A lifecycle manager can manage audio session interactions with a user, such as live agent interactions, digital agent interactions, and transitions between them. In some implementations, the lifecycle manager can connect the user to a live agent for resolution of issue type or other fact resolution. A live agent may be more effective at understanding the issue the user is calling about than an automated system. Accordingly, the live agent can gather information and make selections to resolve the user's issues, such as issue type selections, selections of predefined issue workflow(s) that can resolve the user's issues, and/or selection of digital agents to navigate the selected predefined issue workflow(s).

In some implementations, the life cycle manager can then trigger a dialogue between the user and the selected digital agent(s). The selected digital agent(s) can progress the dialogue by navigating the predefined issue workflow(s) selected by the live agent. In some implementations, the live agent can provide the selected digital agent(s) live agent controls, such as facts the live agent has resolved or digital agent instructions. The selected digital agent(s) can omit portions of the predefined issue workflow(s) or augment portions(s) of the predefined issue workflow(s) based on the live agent controls. In some implementations, a live agent can monitor an ongoing dialogue between a user and a digital agent. For example, the monitoring live agent can provide live agent controls in real time to support the dialogue. When real-time live agent controls are received from a monitoring live agent, the digital agent(s) can generate a speech response to the user based on the real-time live agent controls.

In some implementations, once a dialogue between the user and the selected digital agent(s) has concluded, the lifecycle manager can trigger a follow-up dialogue. For example, the lifecycle manager can select follow-up digital agent(s) and follow-up predefined workflow(s) for the user based on the contents of the previous dialogue with the user. In some implementations, the previous dialogue may have included one or more user actions for the user to perform, and the follow-up digital agent(s) may assist the user in performing these actions.

Some service provider systems may offer a digital agent dialogue option and a live agent dialogue option, however the transition between them in conventional systems is highly inefficient. For example, such transition scenarios often require the user to repeat dialogue to both the live agent and digital agent. In addition, conventional user call routing often relies on an automated system to resolve an issue type for a user and select a workflow for the user's issues. However, these automated systems can be ineffective at resolving user issues with a degree of nuance or user issues that do not fall squarely within a predefined category. These shortcomings of conventional service provider systems can require user repetition, decrease user satisfaction, and ultimately lead to inefficient resource utilization.

Implementations leverage a live agent for issue type resolution and other fact resolution at the outset of an audio session with a user. Because a live agent identifies the issue types and selects the digital agent(s) to resolve the user's issues, the selected digital agent(s) are more likely to be successful as compared to an automated system selecting the issue type and/or digital agents. For example, the live agent's selection of digital agent(s) and/or predefined issue workflow(s) may achieve a digital agent dialogue with the user that is successful at resolving the user's issues. In addition, the live agent controls provided by the live agent to the digital agent(s) reduces the repetition required from the user, enables the live agent to provide intervention input to improve the effectiveness of the digital agent(s), and improves resource efficiency.

Some implementations also trigger a follow-up dialogue with the user after an initial dialogue. This follow-up dialogue with a follow-up digital agent can also improve the user's experience, as the user can receive guidance on user actions related to the initial dialogue. Implementations thus achieve effective management across the lifecycle of a user interaction that improves the user's experience with the service provider, deploys digital agent(s) in a manner that increases resource efficiency, and improves issue resolution success rate.

Several implementations are discussed below in more detail in reference to the FIGURES. FIG. 1 is a block diagram illustrating an overview of devices on which some implementations of the disclosed technology can operate. The devices can comprise hardware components of a device 100 that configure smart digital agent(s) for interactions over a user interaction lifecycle. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, lifecycle interaction manager 164, and other application programs 166. Memory 150 can also include data memory 170, e.g., user log data (e.g., user account logs, audio session logs, etc.), predefined workflow(s), control data for smart digital agent(s), configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
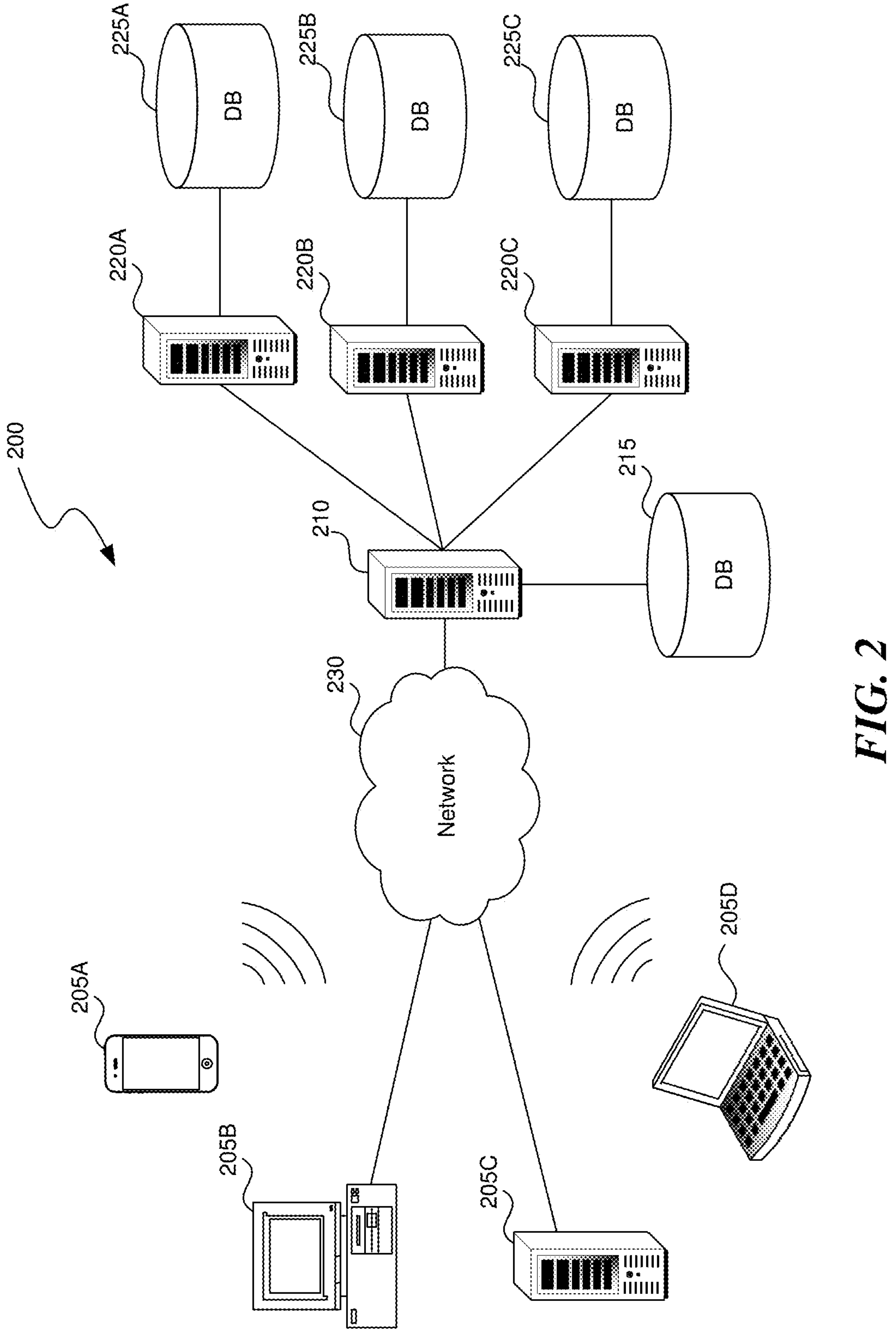
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database.

Databases 215 and 225 can warehouse (e.g., store) information such as user log data (e.g., user account logs, audio session logs, etc.), predefined workflow(s), control data for smart digital agent(s). Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
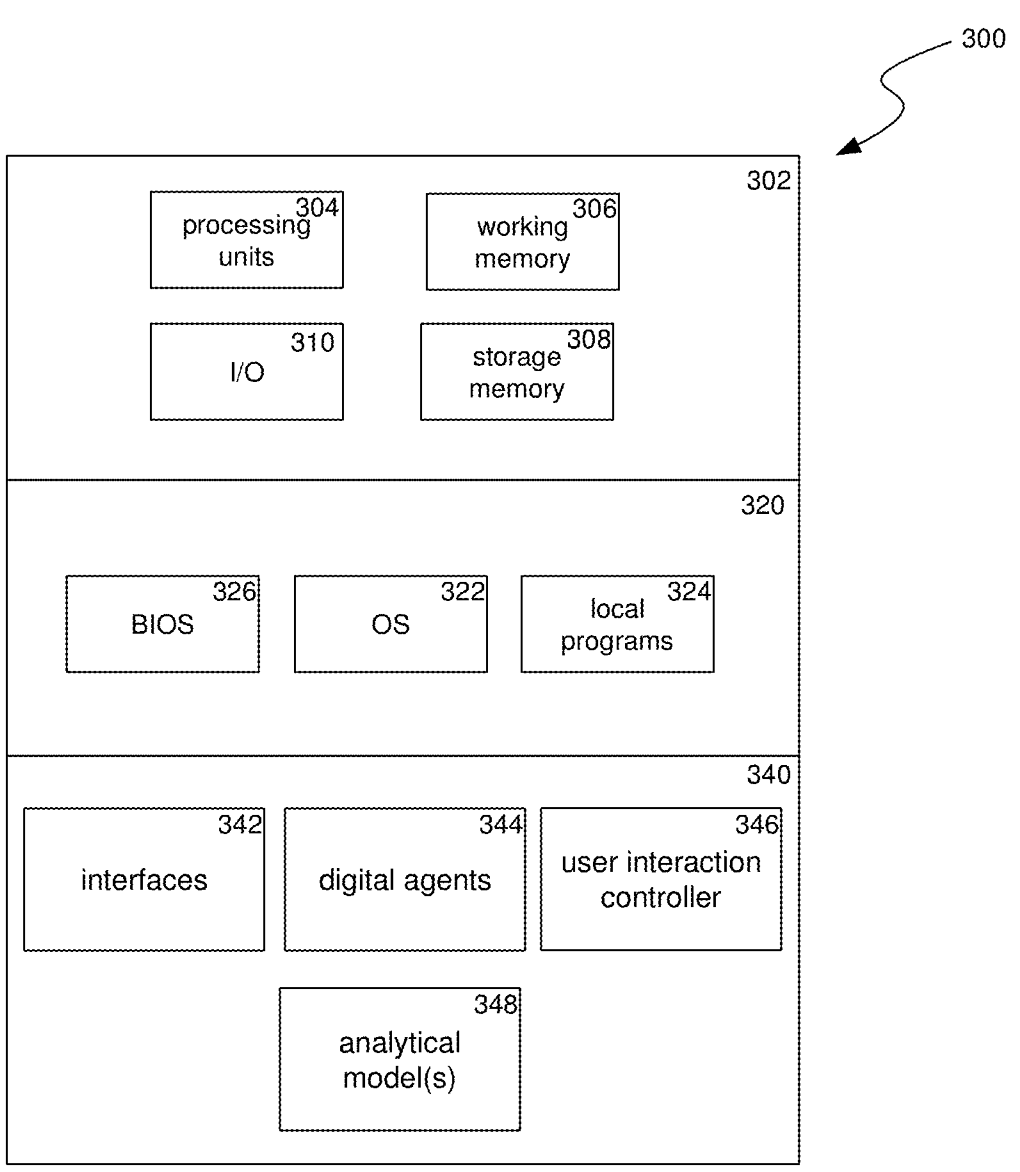
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include digital agents 344, user interaction controller 346, analytical model(s) 348, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Digital agents 344 can manage a dialogue with users over real-time audio or textual sessions. For example, digital agents 344 can comprise one or more analytical model(s) 348 (e.g., machine learning models) configured to process user speech or text and provide digital agent responses. The responses generated by digital agents 344 can be based on a predefined workflow that matches the user's issue(s), a response predicted to resolve the user's issue(s), any combination thereof, or any other suitable model-based information. In some implementations, digital agents 344 can detect an intervention criteria for an on-going dialogue with a user. For example, digital agent 344 can predict user emotions, progression on the user's issue via the digital agent dialogue, and/or other suitable metrics with respect to the impact of the digital agent dialogue on the user. Using these prediction(s), digital agents 344 can detect an intervention criteria that triggers a transition from digital agents 344 to a live agent. Descriptions with reference to FIG. 4 and blocks 706, 708, 710, 712, 714, and 716 of FIG. 7, and block 804 of FIG. 8 further describe the functionality of digital agents 344.

User interaction controller 346 can manage audio or textual sessions with users, such as receiving audio calls, initiating audio calls, textual IM sessions, and connecting users to service agents (e.g., digital agents, live agents, etc.). For example, user interaction controller 346 can be configured to receive an incoming audio session (e.g., telephone call, real-time communication session with audio, text, etc.) from a user system (e.g., smartphone, laptop, tablet, etc.) and/or initiate a session with a user system. In some implementations, user interaction controller 346 can initiate an audio or textual session with a user in response to the user accepting a prompt via an application executing at the user system, user acceptance via message (e.g., SMS message, email, software application message, etc.), a trigger condition that prompts the session (e.g., detected likelihood of fraud, user account issues, etc.), and the like. User interaction controller 346 can connect users to service agents, such as a digital agent or a live agent, and/or transition users among different agents.

In some implementations, user interaction controller 346 can configure digital agents 344 with live agent controls. For example, a live agent can provide input that comprises controls for a digital agent, such as digital agent instructions and/or facts related to an issue. The live agent controls can aid the digital agents 344 in navigating predefined workflow(s) for resolving a user issue.

In some implementations, user interaction controller 346 can trigger a follow-up interaction after a dialogue with a user. For example, user interaction controller 346 can select a follow-up one of digital agents 344 for a follow-up dialogue based on the substance of the previous dialogue with the user. User interaction controller 346 can trigger a dialogue between the user and the selected follow-up digital agent, and the follow-up digital agent can navigate a follow-up workflow during the triggered dialogue. Descriptions with reference to FIG. 4 and blocks 706, 708, 710, 712, 714, and 716 of FIG. 7, and block 804 of FIG. 8 further describe the functionality of user interaction controller 346.

Analytical model(s) 348 can analyze session data and other sources of user context and provide model output, such as responses to user speech, user context metrics/predictions, or any other suitable model output. In some implementations, digital agents 344 can include analytical model(s) 348 for navigating a digital agent dialogue, such as natural language processing models (e.g., machine learning models, etc.) that receive user language (e.g., audio, text, a transcript of user speech, etc.) and provide responses. For example, the dialogue can include a series of questions and/or prompts configured to navigate a predefined workflow to resolve a user issue. In some implementation, analytical model(s) 348 can generate dialogue for digital agent 344 using sources of user context, such as logs of user activity (e.g., application logs, web logs, accounts logs, server logs, etc.), historical audio session and/or chat session transcripts, and other suitable sources.

In some implementations, analytical model(s) 348 can also predict performance metric(s) for an on-going digital agent dialogue with a user, such as an emotional state of the user during the digital agent dialogue. For example, analytical model(s) 348 can analyze the user's tone, word choice, speech cadence, or other suitable factors to predict the user's emotional state. Other example performance metric(s) can include: user satisfaction with the digital agent, time duration for dialogue progression, prediction metric(s) that the user's issues can be resolved by the digital agent, or any combination thereof. Descriptions with reference to FIG. 4 and blocks 706, 708, 710, 712, 714, and 716 of FIG. 7, and block 804 of FIG. 8 further describe the functionality of analytical model(s) 348.

Machine learning model(s) can be any machine learning model(s) suitable for analyzing audio session data (e.g., user speech, user responses to prompts, etc.), user data (e.g., user history, computing device logs, etc.), user account data (e.g., user account status, user account history, user account changes, etc.), and the like. Machine learning model(s) can include natural language processing models that receive user speech (or a transcript of a user speech) and provide responses to the user speech. For example, the dialogue can include a series of organized questions and/or prompts configured to navigate a workflow, such as a workflow designed to resolve particular user issue types. In some implementations, machine learning model(s) can be part of a digital agent that navigates the dialogue with the user.

Machine learning model(s) can be supervised learning models, unsupervised learning models, or other models that can analyze call data, user data, user account data, and the like. Example machine learning model(s) include neural networks (e.g., simple neural networks, recurrent neural networks, convolutional neural networks, generative neural networks, etc.), natural language processing models, transformer models, encoder and decoder architecture models, generative machine learning models (e.g., large language models, generative encoder-decoder models, generative adversarial networks, etc.), support vector machines, decision trees, Parzen windows, Bayes models, clustering models, reinforcement learning models, probability distribution models, decision trees, decision tree forests, and others. Models can be configured for various situations, data types, sources, and output formats.

A "machine learning model," as used herein, refers to a construct that is trained or configured using data set(s) (e.g., training data) to make predictions, provide probabilities for new data items (whether or not the new data items were included in the training data), generate new data, or perform any other suitable predictive function. For example, training data for supervised learning can include items with various parameters and an assigned classification or prediction value. A new data item can have parameters that a model can use to assign a classification to the new data item or predict a value. As another example, a model can be a probability distribution resulting from the analysis of training data, such as a likelihood of an n-gram occurring in a given language based on an analysis of a large corpus from that language. A machine learning model can include a generative model (e.g., generative adversarial network (GAN), large language model, etc.), such as a natural language processing model trained to generate responses to user prompts, and the like.

Figure 4:
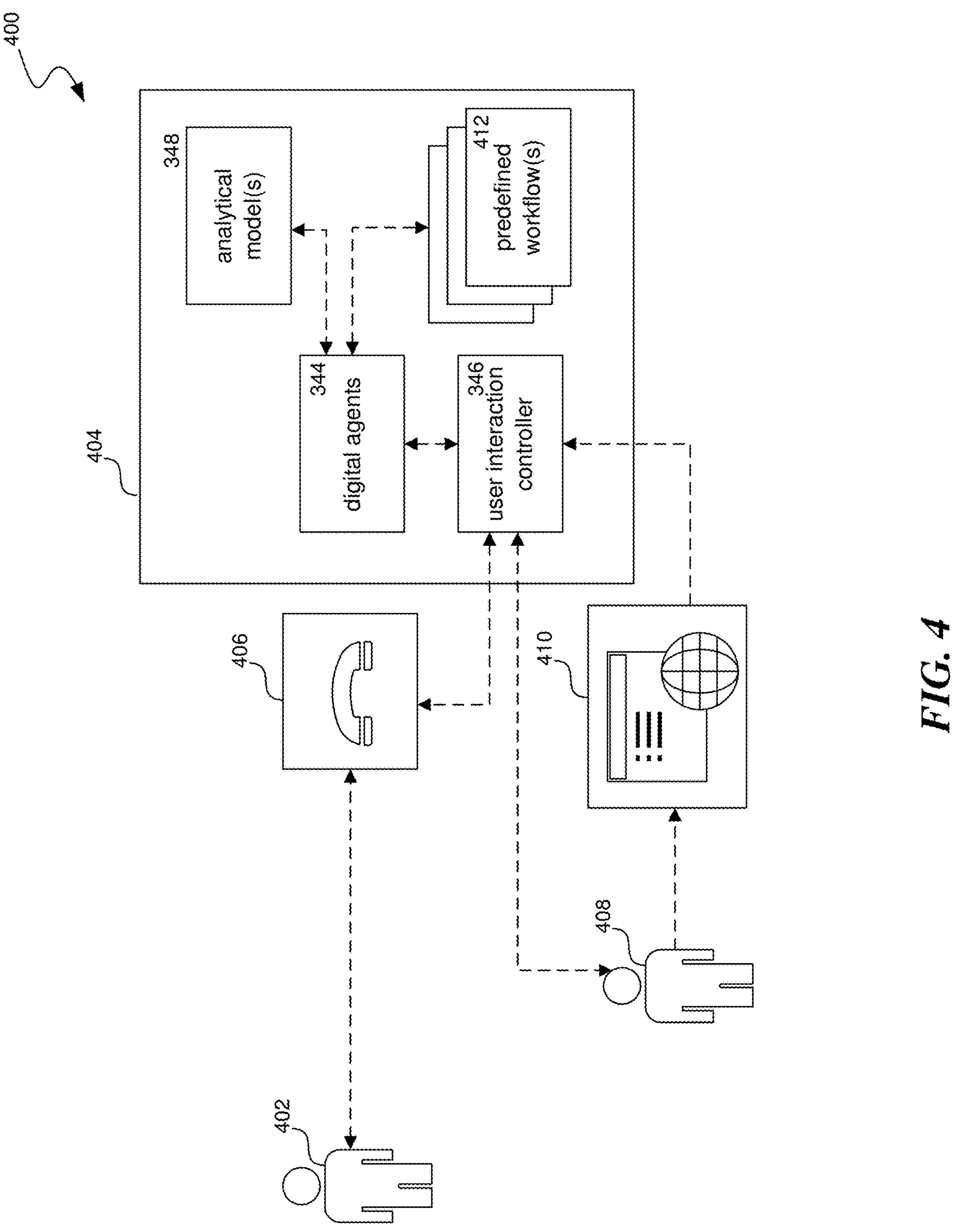
FIG. 4 is a conceptual diagram illustrating an example system for configuring smart digital agent(s) for interactions over a user interaction lifecycle.

Implementations achieve efficient management of user interactions over a lifecycle via smart digital agents and live agents. FIG. 4 is a conceptual diagram illustrating an example system for configuring smart digital agent(s) for interactions over a user interaction lifecycle. Diagram 400 illustrates user 402, service provider system 404, audio (or text) session 406, live agent 408, live agent controls 410, and predefined workflow(s) 412. Diagram 400 also depicts components of FIG. 3, including digital agents 344, user interaction controller 346, and analytical model(s) 348.

User 402 can be an account holder with service provider system 404. User 402 can be any suitable account holder, combination of account holders, etc. The account service provider can be a single service provider or multiple service providers configured to provide user 402 assistance with the user's account(s) (or provide the user other suitable services). User 402 can initiate a session with service provider system 404 via audio (or text) session 406. For example, user 402 may have an issue that the user is attempting to resolve via the audio session. In some implementations, the session can be a telephone call, audio session over a real-time communication channel implemented via a software application, IM or other text session, or any other suitable session. In some implementations, the session can be an audio and video session.

User 402 may initiate audio (or text) session 406 via any suitable client system (e.g., smartphone, smart home device, laptop, tablet, desktop, or any other suitable computing system). Service provider system 404 can receive the session initiation (e.g., telephone call, real-time communication channel initiation, etc.) via user interaction controller 346, which can implement an automated call system and/or a live agent system. The automated call system and/or a live agent system can comprise any suitable hardware components, such as cloud computing devices, edge computing devices, telephone hardware, telephone system components, desktops, laptops, and the like. In some implementations, service provider system 404 and user interaction controller 346 can initiate the session with the user's client system.

User interaction controller 346 can connect user 402 to live agent 408. For example, live agent 408 can determine the purpose/issue related to the user's call and perform actions to manage the user interaction lifecycle, such as identify one or more issue types for user 402's session, select one or more of digital agents 344 for a dialogue with user 402 based on the issue type(s), provide live agent controls used to configure the selected one or more of digital agents 344, and the like. In some implementations, one or more of digital agents 344 may perform introductory portions of a dialogue with a user (e.g., determine user's name, accounts number(s), etc.) prior to connection with live agent 408.

Figure 5:
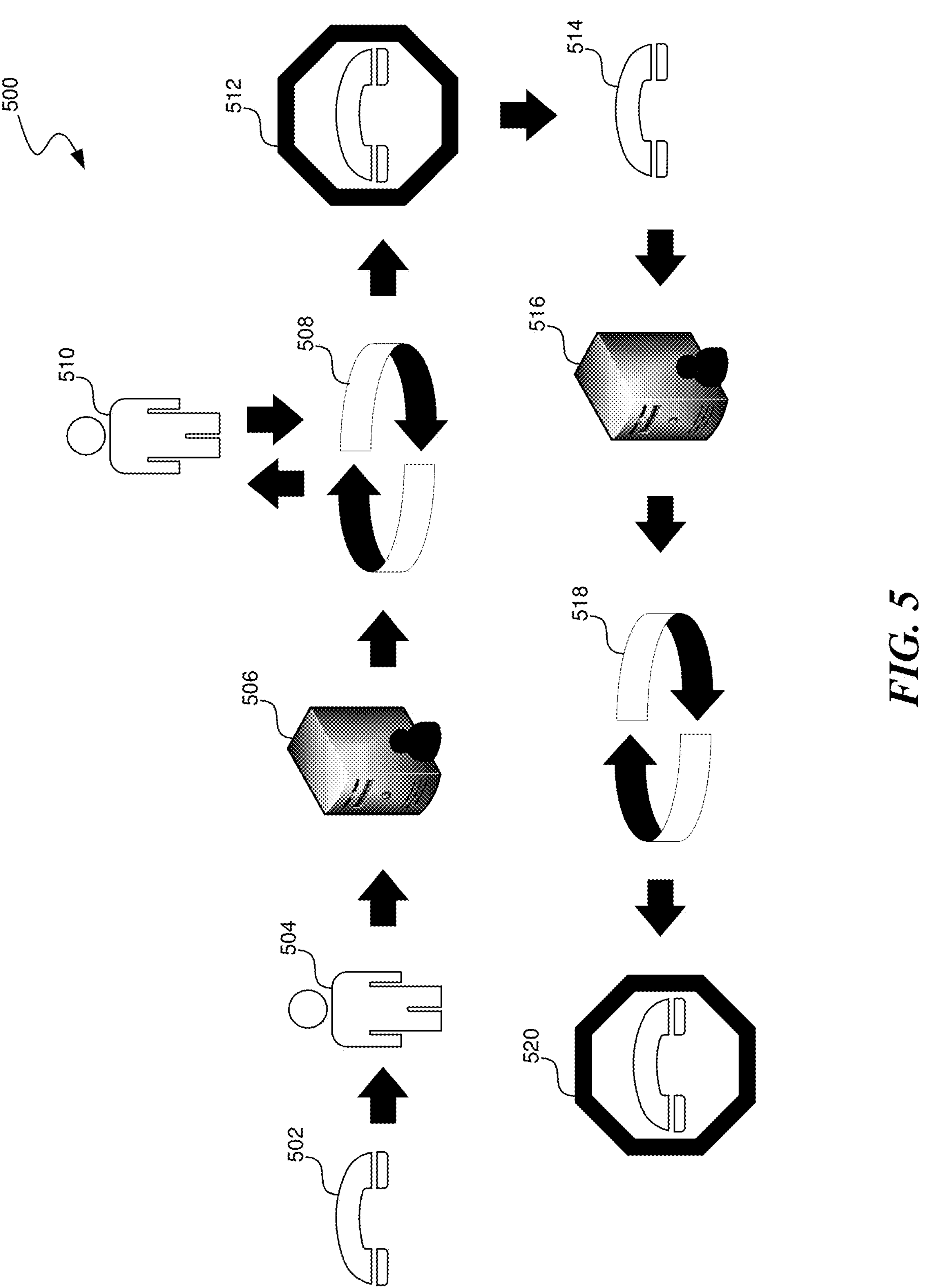
FIG. 5 is a conceptual diagram illustrating an example workflow for configuring smart digital agent(s) for interactions over a user interaction lifecycle.

Live agent 408 may identify issue(s) for user 402 that correspond to one or more issue types. For example, user 402 may be calling for any variety of reasons: add a person to an insurance policy, add a type of insurance, change coverage types for an insurance, add or change a beneficiary to one or more accounts (e.g., bank account, insurance account, etc.), resolve a fraud alert or report suspicious activity, make an insurance claim, and the like. Live agent 408 can assess an issue type that corresponds to user 402's call purpose via discussion with user 402. Predefined issue workflow(s) 412 can be structured workflow(s) designed to resolve a variety of issue types. For example, predefined issue workflow(s) 412 can comprise a structure (e.g., states and state transitions, organized prompts, etc.) that, when navigated, configure one or more of digital agents 344 to resolve an issue of a particular issue type. Navigating predefined issue workflow(s) 412 can include one or more of digital agent(s) 344 generating natural language (e.g., audio or text) responses and/or prompts that cause user 402 to provide information to resolve such issue(s). FIG. 5 further describes an example of predefined issue workflow(s) 412.

In some implementations, live agent 408 can then select one or more digital agent(s) 344 to perform one or more predefined issue workflow(s) 412 with user 402 via a dialogue to resolve the user's issue(s). For example, digital agents 344 can be categorized according to issue type, the predefined issue workflow(s) 412 that the digital agent is configured to perform, languages compatible with the digital agents 344, and any other suitable categorization parameters. Because live agent 408 identifies the issue type(s) and selects one or more of digital agents 344 to resolve the user's issue(s), the selected one or more of digital agents 344 may be more likely to resolve the user's issue(s) as compared to an automated system selecting the issue type and/or one or more of digital agents 344.

Live agent 408 can also provide live agent controls 410 that configure the selected one or more digital agents 344, such as provide the digital agent(s) instructions on how to navigate ones of predefined issue workflow(s) 412 and/or provide issue facts that live agent 408 has resolved. When live agent controls 410 can include one or more resolved facts, the selected digital agent(s) may omit portion(s) of predefined issue workflow(s) 412, such as portions related to settling the fact resolved by the live agent controls 410. For example, where the issue type relates to adding a driver to a user's insurance policy, the resolved fact can be: "new driver is the son or daughter of the policy holder". Live agent 408 may have been able to efficiently resolve this fact via discussion with user 402. As a result, the selected digital agent(s) can omit portions of predefined issue workflow(s) 412 that relate to resolving the new driver's relationship to the policy holder. In this example, live agent 408 may quickly resolve one or more facts that would take additional time if resolved by the selected digital agent(s), and thus increase the efficiency of the selected digital agent(s) and shorten the overall time span of the user interaction lifecycle.

In another example, live agent controls 410 can include instructions, such as an instruction to add portion(s) to an existing one of predefined issue workflow(s) 412. An example digital agent instruction can be "confirm user information according to new primary residence workflow." In this example, live agent 408 may have resolved that the user has recently moved their primary residence. The issue the user is calling about and corresponding issue type may be loosely related to the new primary residence for the user, for example because paperwork may need to be mailed to the user's primary residence. Based on the digital agent instruction contained in live agent instructions 410, the selected one or more of digital agents 344 may initially perform an information gathering workflow that confirms specific user information (e.g., home address, phone number, email, etc.), and then subsequently perform the one or more predefined issue workflow(s) 412 that resolve the issue the user is calling about.

In some implementations, the selected digital agent(s) can implement a digital agent dialogue with user 402, such as in response to a trigger condition and/or user interaction controller 410 triggering the dialogue. For example, user interaction controller 410 can receive the selection(s) from live agent 408 and transition audio session 406 from live agent 408 to the selected ones of digital agent(s) 344. A digital agent dialogue can progress through one or more predefined issue workflow(s) 412 selected by live agent 410 to resolve user 402's issue(s). In some implementations, the one or more digital agents 344 can interact with analytical model(s) 348 to perform the digital agent dialogue with user 402, such as provide a series of audio prompts or responses to user 402 utterances. For example, the predefined issue workflow(s) navigated by the selected one or more of digital agents 344 can prompt user 402 for granular information with respect to the issue user 402 is calling about.

FIG. 5 is a conceptual diagram illustrating an example workflow for configuring smart digital agent(s) for interactions over a user interaction lifecycle. Diagram 500 includes audio session initiation 502, live agent 504, digital agent 506, workflow navigation 508, monitoring live agent 510, dialogue conclusion 512, follow-up dialogue initiation 514, digital agent 516, follow-up workflow navigation 518, and follow-up dialogue conclusion 520.

Audio (or text) session initiation 502 can represent a start to a session between a user and a service provider. The session can be user initiated or service provider initiated. After initiation, live agent 504 can be connected to the session with the user. For example, a user interaction controller can connect live agent 504 to the session with the user. In some implementations, one or more automated systems and/or digital agents can perform an introductory workflow on the session with the user prior to connection with live agent 504.

Based on discussion between the user and live agent 504 on the session, live agent 504 can make selection(s) for the user interaction lifecycle. The selections can include an issue type selection, a digital agent selection, and an issue workflow selection. For example, live agent 504 can converse with the user to determine what issue the user intends to resolve via the session (e.g., add a beneficiary to an account, add a driver to an insurance policy, make an insurance claim, etc.). Live agent 504 can then select the issue type(s) that best reflect the user's issue(s). The digital agent selection and/or issue workflow selection can be based on the selected issue type(s). For example, digital agents and/or issue workflows can be categorized by issue type. Accordingly, live agent 504 can select digital agent(s) and/or issue workflow(s) based on the user's issue type(s). In some implementations, multiple digital agents and/or issue workflow(s) can resolve similar issue type(s), and thus live agent 504 can use human judgement to select digital agent(s) and/or issue workflow(s) that will be effective.

Figure 6:
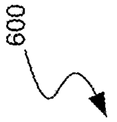
FIG. 6 is a diagram of an example data structure of a predefined workflow.
Figure 6:
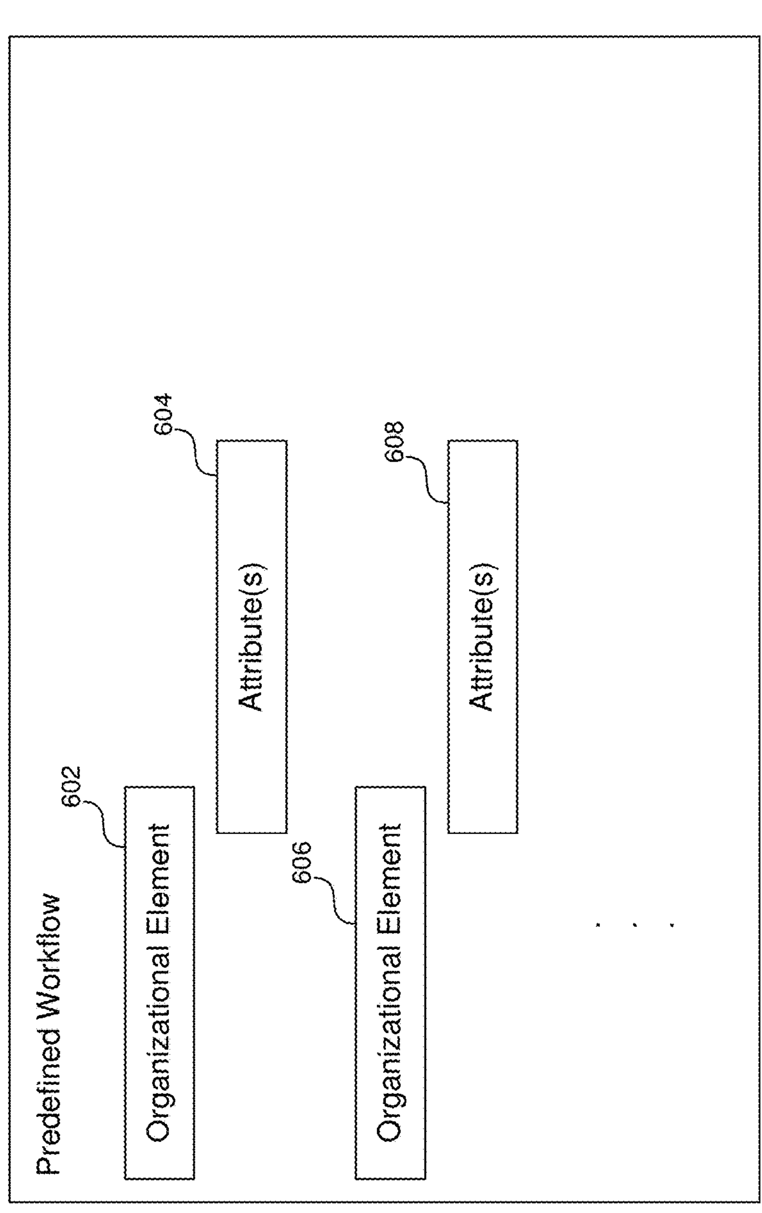

Once live agent 504 makes selections, the session can be transitioned from live agent 504 to digital agent(s) 506. Digital agent(s) 506 can perform workflow navigation 508, or navigate the selected issue workflow(s). In some implementations, the selected issue workflow(s) can be predefined workflow(s) that comprise a structure. The structure for a given issue workflow can provide digital agent(s) 506 a framework for a dialogue with the user so that progression through the dialogue resolves an issue type that corresponds to the given issue workflow. FIG. 6 is a diagram of an example data structure of a predefined workflow. Workflow data structure 600 includes organizational element 602, attribute(s) 604 under organizational element 602, organizational element 606, and attribute(s) 608 under organizational element 606.

In some implementations, organizational elements 602 and 606 can be workflow states that include defined transitions between the states. The workflow states can relate to components of a workflow that resolve an issue type, and the workflow states can be used to define variable values used to resolve the issue type. For example, an issue type related to adding a beneficiary to an insurance policy can correspond to an issue workflow with a series of states: identify the beneficiary, define the beneficiary's relationship to the policy holder, define a type of beneficiary, establish a percentage for the beneficiary, etc. Each of organizational elements 602, 606, and additional organizational elements not illustrated can correspond to states with a corresponding state goal, and each of attributes 604, 608, and additional attributes not illustrated can comprise smart agent data that configures the smart agent to accomplish the state goal.

For example, attributes 604 and 608 can comprise text to resolve the state goal (e.g., "please define your relationship to the policy holder", "To define your relationship with the policy holder, choose one of the below options . . . ", etc.), prompts that configure a generative machine learning model, and the like. In this example, at the conclusion of one or more of the states, a variable value can be defined that progresses resolution of the issue type.

In some implementations, live agent 504 can also provide digital agent(s) 506 with live agent controls that further configure the digital agent(s) to resolve the user's issues. For example, live agent controls can include resolved fact issues and digital agent instructions. Digital agent(s) 506 can utilize the live agent controls to navigate the selected issue workflow(s). Returning to the example of adding a beneficiary to an insurance policy, the following can represent example states in the predefined workflow: identify the beneficiary, define the beneficiary's relationship to the policy holder, define a type of beneficiary, establish a percentage for the beneficiary, and so on. An example live agent control can include the following: the beneficiary is the policy holder's son or daughter. This example live agent control represents an issue fact resolved by live agent 504. For example, during live discussions with the user, live agent 504 may gather certain information and pass this information through live agents controls to digital agent(s) 506, such as facts related to the user's issue type that live agent 504 has resolved. In some implementations, live agent controls can be provided to digital agent(s) 506 when the dialogue between digital agent(s) 506 and the user is triggered. In some implementations, live agent controls can be provided to digital agent(s) 506 during workflow navigation 508 (e.g., real-time live agent controls via monitoring live agent 510).

In response to receiving this example of live agent controls, digital agent(s) 506 can omit one or more portions of the predefined issue workflow, such as the state related to resolving the beneficiary's relationship to the policy holder. For example, one or more analytical models (e.g., trained machine learning models, natural language processing models, etc.) can process the live agent controls and attempt to resolve variable(s) for the issue type (e.g., variable(s) from the predefined issue workflow). When the analytical model(s) predict a given variable value with a confidence that exceeds a threshold, the state in the predefined workflow related to resolving the value of that given variable can be omitted when navigating the workflow.

In some implementations, live agent controls can include digital agent instructions. For example, with respect to the example predefined workflow for adding a beneficiary to an insurance policy, example digital agent instructions can be: perform a workflow that confirms the policy holder's primary residence. In this example, live agent 504 may have determined, via live discussion with the user, that the user has recently had a change in their primary residence. Because adding a beneficiary to an insurance policy may trigger the mailing of documents to the policy holder, the digital agent instructions can mitigate an issue related to misdelivering the triggered documents.

In response to receiving this example live agent control, the predefined workflow that digital agent(s) 506 navigate to resolve the user's issue(s) can be augmented with additional portions, such as an additional workflow or one or more additional components of a workflow (e.g., added states, transitions, variables, prompts, etc.). In addition to navigating the predefined workflow to add a beneficiary to the user's insurance policy, the digital agent(s) 506 can also navigate these additional workflow/workflow components to confirm the policy holder's primary residence. These example live agent instructions can serve multiple purpose, such as: reducing redundancy by passing information to digital agent(s) 506 that has already been resolved; and/or improving effectiveness by augmenting existing predefined workflows with one or more additional components tailored to improve the user's experience.

In some implementations, while digital agent(s) 506 perform workflow navigation 508, monitoring live agent 510 can monitor the dialogue between digital agents(s) 506 and the user. Monitoring agent 510 can be the same or different from live agent 504. Monitoring agent 510 can provide input or additional live agent controls to digital agent(s) 506 during the dialogue. For example, monitoring live agent 510 may be able to resolve a fact related to the user's issue and/or identify one or more additional workflows relevant to resolving the user's issue, and provide additional live agent instructions to digital agent(s) 506 in real-time.

In some implementations, monitoring live agent 510 can provide real-time input to digital agent(s) 506 that simulates user input (e.g., a user utterance). For example, the dialogue between digital agent(s) 506 and the user can include user audio input (e.g., in response to prompts from digital agent(s) and generated audio response from digital agent(s) 506. Real-time input from monitoring agent 510 can include simulated user input (e.g., text, speech, etc.) that mimics input from the user. This simulated input can include clarifications and/or other additional information that can configure digital agent(s) 506 to better assist the user and/or navigate the predefined workflow(s). Examples of simulated use input can be: "ask me about [Concept A]", "when I say [Concept A] I mean [Concept B]", and the like. These inputs can help digital agent(s) 506 understand the input from the user.

In some implementations, during workflow navigation 508 digital agent(s) 506 and/or monitoring live agent 510 can interrupt the dialogue with the user so that monitoring live agent 510 can intervene. For example, digital agent(s) 506 can detect an intervention criteria during workflow navigation 508. In some implementations, digital agent(s) 506 can calculate performance metric(s) with respect to the digital agent dialogue and compare the performance metric(s) to an intervention criteria. When the comparison indicates that the on-going digital agent dialogue is unlikely to resolve the user's issue(s), that the user is unsatisfied, or otherwise indicates a problem with the digital agent dialogue, digital agent(s) 506 and/or monitoring live agent 510 can initiate a transition to monitoring live agent 510. For example, monitoring live agent 510 can be prompted to intervene, and based on input from the live agent, a user interaction controller can transition the audio session with the user from digital agent(s) 506 to monitoring live agent 510.

Example performance metric(s) can include: user satisfaction with the digital agent, time duration for dialogue progression, prediction metric(s) that the user's issue(s) can be resolved by the digital agent, or any combination thereof. The user satisfaction with the digital agent can be determined by analytical model(s) that predict the user's emotional state, such as based on the tone of the user's voice, the user's rate of speech, the user's language, any combination thereof, or any other analysis of the user's input during the dialogue.

For example, analytical model(s) can be trained to predict an emotional state based on the tone of a user's voice and/or changes in the tone of a user's voice. In another example, analytical model(s) can be trained to predict an emotional state based on the user's rate of speech (e.g., speaking quickly, speaking slowly, long user pauses, sighs or other utterances between speech, etc.) and/or changes in the user's rate of speech. In another example, analytical model(s) can be trained to predict emotional state based on the user's language (e.g., speech that indicates frustration, anger, dissatisfaction, etc.) and/or changes in the user's language.

In some implementations, analytical model(s) can generate a user satisfaction score based on the user's emotional state and/or aspects of the user's speech. In this example, the intervention criteria can comprise a user satisfaction threshold, and the user satisfaction score can be compared to the user satisfaction threshold. When the user satisfaction score is below the user satisfaction threshold, digital agent(s) 506 may trigger a transition from the digital agent dialogue to a dialogue with monitoring live agent 510.

In some implementations, one or more performance metric(s) can represent a likelihood (e.g., predicted probability) that the user's issue(s) will be successfully resolved via the digital agent dialogue. For example, the digital agent dialogue may progress along a predefined workflow. A stalled workflow can indicate a low likelihood of success. For example, the duration of time that is spent on a given stage of the workflow can be compared to an expected duration of time to detect that the workflow has stalled. In another example, analytical model(s) can compare user's input (e.g., utterances) during the digital agent dialogue to a data set and/or historical transcripts of user interactions. Utterances by the user that are similar to historical transcripts associated with failed attempts to resolve a user issue can indicate a lower likelihood of success. On the other hand, utterances by the user that are similar to historical transcripts associated with successful instances of resolving a user issue may indicate a higher likelihood of success. In this example, an intervention criteria can comprise a threshold probability, and the likelihood of success can be compared to the threshold probability. When the likelihood of success is below the threshold probability, digital agent(s) 506 may trigger a transition from the digital agent dialogue to a dialogue with monitoring live agent 510.

In some implementations, workflow navigation 508 performed by digital agent(s) 506 can reach a conclusion state. For example, the conclusion state can be reached based on successfully navigating the predefined issue workflow(s), intervention(s) and/or live agent instructions from monitoring live agent 510, or via any other suitable dialogue progression. Dialogue conclusion 512 can represent the conclusion of workflow navigation 508, such as the end of a phone call with a user.

In some implementations, follow-up dialogue initiation 514 can be triggered after dialogue conclusion 512. For example, the follow-up dialogue can be a dialogue between the user and digital agent(s) 516 prompted based on: the substance of the initial dialogue with the user, instructions from live agents (e.g., live agent 504 and/or monitoring live agent 510), or any other suitable trigger. In some implementations, follow-up dialogue initiation 514 can be triggered in response to detected user activity, such as: user interactions with the service provider's web presence or application, account actions taken by the user, a chat session with the user, and the like. Follow-up dialogue initiation 514 can also be triggered in response to a message to the user that requests the follow-up dialogue and user input that accepts the request. Follow-up dialogue initiation 514 can be performed a period of time after (e.g., minutes, hours, days, weeks, months, etc.) dialogue conclusion 512.

In some implementations, the follow-up dialogue can relate to one or more user actions associated with the initial user dialogue and/or the issues resolved via workflow navigation 508. For example, when the user's issue(s) and the navigated issue workflow(s) relate to a vehicle insurance claim, follow-up actions can relate to repairing the user's vehicle. Digital agent(s) 516 can perform follow-up workflow navigation 518 to support the user in completing these follow-up actions.

Example follow-up actions related to a vehicle insurance claim issue can include: setting up a rental car for the user, initiating one or more appointments with vehicle body shops, initiating one or more appointments with health care providers, executing a rental car extension, and the like. In some implementations, follow-up workflow navigation 518 can relate to providing the user additional information or support related to the user's issue, such as providing explanations on vehicle coverage with respect to the user's insurance claim, follow-up actions related to preventing fraud, confirming that the user has received health care treatments and/or recovered after an accident, providing survivor care after an accident, and the like. In another example, the user's issue(s) can relate to a home mortgage, and example follow-up actions can include: supporting appraisal of the property, obtaining additional details related to a mortgage (e.g., home owner's insurance, security system information, etc.), supporting inspection of the home, and the like.

Predefined follow-up workflow(s) can be selected for follow-up workflow navigation 518. In some implementations, these predefined follow-up workflow(s) can be selected according to: predefined associations with the initial issue workflow(s) navigated via workflow navigation 508, analysis of the substance of the initial dialogue with the user (e.g., transcript analysis by natural language models) that identifies follow-up user actions, live agent 504 selections, (e.g., at the time of digital agent(s) 506 selection and/or selection of predefined issue workflow(s)), monitoring live agent 510 selections (e.g., during performance of and/or at the conclusion of workflow navigation 508), and the like. Digital agent(s) 516 can navigate the selected follow-up workflow(s) during follow-up workflow navigation 518 to support the user throughout the lifecycle of the user's issue. For example, multiple follow-up dialogues can be conducted between the user and digital agent(s) 516.

Follow-up dialogue conclusion 520 can represent a conclusion of the interaction with the user with respect to the issue(s) the user initially called about at the time of audio session initiation 502. Accordingly, digital agent(s) and/or live agent(s) can interact with the user at different points of time during the user interaction lifecycle to resolve user issue(s) and manage the user's experience.

Those skilled in the art will appreciate that the components illustrated in FIGS. 1-6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 7:
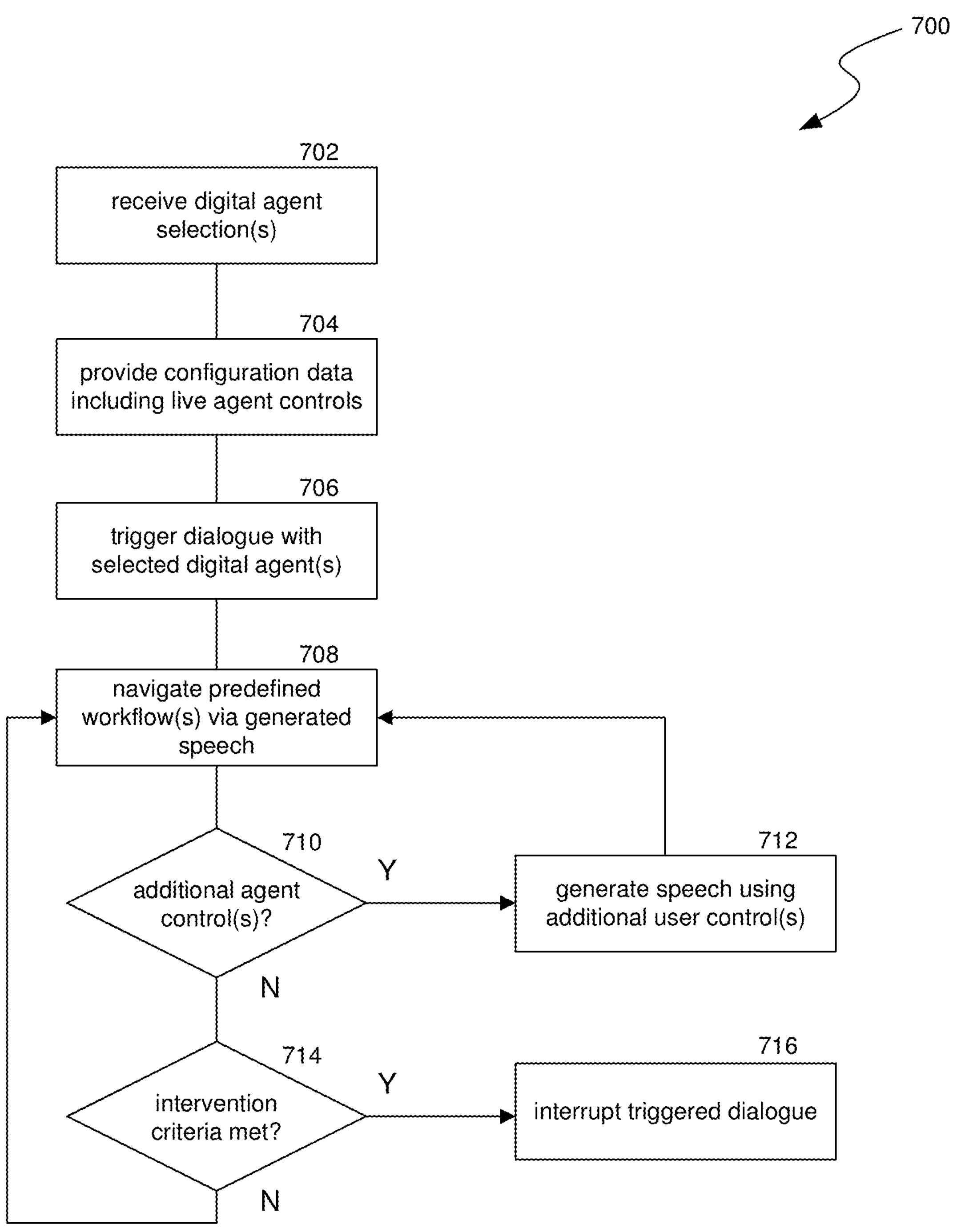
FIG. 7 is a flow diagram illustrating a process used in some implementations for configuring smart digital agent(s) for interactions over a user interaction lifecycle.

FIG. 7 is a flow diagram illustrating a process used in some implementations for configuring smart digital agent(s) for interactions over a user interaction lifecycle. In some implementations, process 700 can be performed in response to an audio session with a user. In some implementations, process 700 can be performed by any suitable computing system(s), such as cloud system(s), edge system(s), client system(s), or any combination thereof.

At block 702, process 700 can receive digital agent selection(s) from a live agent. For example, during an audio or textual session with user (e.g., phone call, real-time communication session, IM, etc.) a live agent can conduct a live discussion with the user for user issue recognition, fact gathering, and/or to resolve other matters related to the user call. In some implementations, the live agent can resolve issue type(s) for the user's issue(s) and make selections according to the resolved issue type(s). For example, the live agent can select digital agent(s) for a dialogue with the user and/or predefined issue workflow(s) that correspond to the user's issue(s).

In some implementations, the live agent can provide selections of one or more smart digital agents from among a plurality of smart digital agents for the user session. For example, the plurality of smart digital agents and/or predefined issue workflows can be categorized based on user issue types, and the selections can be made according to the resolved issue type(s) for the user.

At block 704, process 700 can provide configuration data including live agent controls to the selected digital agent(s). In some implementations, the configuration data can include live agent controls (e.g., as issue facts or smart digital agent instruction) with respect to one or more user issue types the selected smart digital agent(s) are configured to resolve. Issue facts can be facts the live agent has resolved based on conversation with the user and/or accessing the user's account. Smart digital agent instructions can be instructions for the smart digital agent(s) that can configure these agents to navigate the selected issue workflow(s).

At block 706, process 700 can trigger a dialogue with the selected smart digital agent(s). For example, in response to provided live agent selections and live agent controls, the audio session with the user can be transitioned from the live agent to the selected smart digital agent(s).

At block 708, process 700 can navigate predefined workflow(s) by generating speech responses via the selected smart digital agent(s). For example, the selected smart digital agent(s) can navigate the predefined issue workflow(s) by analyzing audio or textual input from the user and generating responses to the user based on a flow of the predefined issue workflow(s).

In some implementations, the selected smart digital agent(s) can omit one or more portions of the predefined issue workflow(s) based on the issue facts and/or the smart digital agent instructions provided to the smart digital agent(s) via the live agent controls. For example, the predefined issue workflow(s) can comprise user or issue variables that the smart digital agent(s) are configured to resolve via the dialogue. The live agent controls can comprise at least one issue fact that resolves at least one user or issue variable, and the smart digital agent(s) can omit the portion of the predefined issue workflow(s) that corresponds to the issue variable.

In some implementations, the selected smart digital agent(s) can augment the predefined issue workflow(s) with one or more additional portions based on the issue facts and/or the smart digital agent instructions provided to the smart digital agent(s) via the live agent controls. For example, the predefined issue workflow(s) can comprise user or issue variables that the smart digital agent(s) are configured to resolve via the dialogue. The live agent controls can comprise at least smart digital agent instruction that introduces a new user or issue variable, and the smart digital agent(s) can augment a portion of the predefined issue workflow to resolve the introduced new user or issue variable.

In some implementations, the predefined workflow can include a workflow structure with workflow states and workflow transitions. Navigating the predefined issue workflow by the smart digital agent(s) can include generating the speech responses by progressing through the workflow states according to the workflow transitions.

In some implementations, the smart digital agent(s) can ingest the live agent controls and compare the ingested live agent controls to the predefined issue workflow. One or more portions of the predefined issue workflow(s) can be identified based on the comparison. The smart digital agent(s) can perform one or more of: omitting the identified one or more portions of the predefined issue workflow; or augmenting the identified one or more portions of the predefined issue workflow with one or more additional workflow portions. For example, the portion(s) of the predefined issue workflow identified based on the comparison can include one or more states and one or more state transitions that match the live agent controls. The smart digital agent(s) can perform one or more of: omitting the one or more states and one or more state transitions that match the live agent controls; or augmenting the one or more states and one or more state transitions that match the live agent controls with one or more additional workflow portions.

In some implementations, the predefined workflow can include a series of organized language prompts and navigating the predefined issue workflow by the smart digital agent(s) can include providing the organized language prompts to a generative machine learning model to generate the speech responses. Portion(s) of the predefined issue workflow(s) can be identified by comparing live agent controls to the predefined issue workflow(s), where the identified portion(s) can be language prompts that match the live agent controls. The smart digital agent(s) can perform one or more of: omitting the identified portion(s) of the predefined issue workflow(s); or augmenting the identified portion(s) of the predefined issue workflow(s) with one or more additional workflow portions.

At block 710, process 700 can detect real-time live agent control(s). For example, a live agent can monitor the triggered dialogue and provide real-time live agent control(s) during the dialogue. When real-time live agent control(s) are detected, process 700 can progress to block 712. When real-time live agent control(s) are not detected, process 700 can progress to block 714.

At block 712, process 700 can generate speech responses using the real-time live agent control(s). For example, the selected digital agent(s) can use the real-time live agent control(s): to generate speech responses using the live agent control(s) as prompts to generate the speech; as navigation controls that control the digital agent's navigation of the predefined issue workflow(s), a combination of these, or to perform any other suitable digital agent functionality in response to live agent controls.

In some implementations, the real-time live agent controls can be real-time live agent input that simulates audio input from the user. For example, the input can be from the monitoring live agent, but can be provided to the smart digital agent(s) as simulated user audio input. The smart digital agent(s) can then generate a speech response to the simulated user input. The user can be provided the real-time live agent input that simulates the input from the user, or the user can be restricted from the real-time live agent input that simulates the input from the user.

At block 714, process 700 can determine whether an intervention criteria is met. For example, during the triggered dialogue a user satisfaction score can be calculated based on a progress of navigating the predefined issue workflow(s) and/or the user input. The user satisfaction score can be compared to the intervention criteria to determine whether the score meets the criteria (e.g., is above or below a score threshold).

When the intervention criteria is met (e.g., the satisfaction score is below a threshold), process 700 can progress to block 716. When the intervention criteria is not met (e.g., the satisfaction score is above a threshold), process 700 can loop back to block 708, where the predefined issue workflow(s) can be navigated until reaching a conclusion state (e.g., until concluding the audio session with the user) or until the intervention criteria is met.

At block 716, the triggered dialogue with the smart digital agent(s) can be interrupted. For example, the live agent monitoring the triggered dialogue can be prompted to interrupt the smart digital agent(s) such that the audio session with the user can be transitioned from the smart digital agent(s) to the monitoring live agent. The smart digital agent(s) can be configured to pause or terminate navigating the predefined issue workflow(s) when the live agent interrupts the dialogue.

Figure 8:
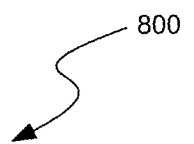
FIG. 8 is a flow diagram illustrating a process used in some implementations for configuring smart digital agent(s) for follow-up interactions during a user interaction lifecycle.
Figure 8:
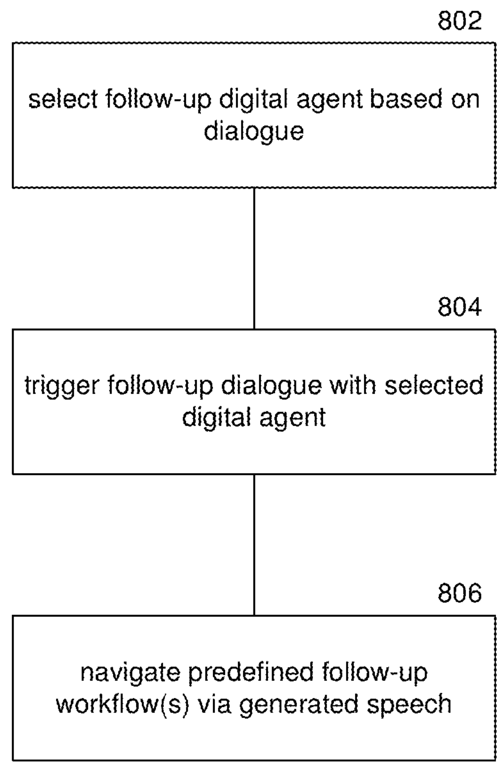

FIG. 8 is a flow diagram illustrating a process used in some implementations for configuring smart digital agent(s) for follow-up interactions during a user interaction lifecycle. In some implementations, process 800 can be triggered after a digital agent dialogue with a user has concluded. In some implementations, process 800 can be performed by any suitable computing system(s), such as cloud system(s), edge system(s), client system(s), or any combination thereof.

At block 802, process 800 can select follow-up digital agent(s) based on a previous dialogue with a user. For example, process 700 of FIG. 7 can be used to conduct a first dialogue with a user that includes live agent portions and digital agent portions. The transcript of the first dialogue can be analyzed to select smart digital agent(s) to perform a follow-up dialogue. In some implementations, analyzing the transcript can include identifying action items for the user, and the selected follow-up digital agent(s) can correspond to digital agent(s) configured to navigate predefined workflows related to the specific action items identified. In some implementations, the follow-up digital agent(s) can be selected based on one or more follow-up actions associated with the first smart digital agent dialogue, the predefined issue workflow(s) navigated during the first smart digital agent dialogue, and/or the user's issue type(s) addressed during the first smart digital agent dialogue.

At block 804, process 800 can trigger the follow-up dialogue between the user and the selected digital agent(s). For example, a period of time after the first dialogue with the user (e.g., minutes, hours, days, weeks, months, etc.) the follow-up dialogue can be triggered between the user and the follow-up smart digital agent(s) configured to navigate the predefined follow-up workflow(s). At block 806, process 800 can navigate predefined follow-up workflow(s) by generating speech responses via the selected smart digital agent(s). The selected follow-up digital agent(s) can navigate the predefined issue workflow(s) by analyzing audio input from the user and generating speech responses to the user based on a flow of the predefined follow-up workflow(s).

Several implementations of the disclosed technology are described above in reference to the FIGURES. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for configuring smart digital agent(s) for interactions over a user interaction lifecycle, the method comprising:

receiving, via interactions with a live agent, selections of one or more smart digital agents from among a plurality of smart digital agents for a user interaction, wherein the plurality of smart digital agents are categorized based on user issue types;

providing, based on input from the live agent, configuration data for the user interaction, wherein the configuration data comprises live agent controls with respect to one or more user issue types the selected smart digital agent is configured to resolve, the live agent controls comprising issue facts or smart digital agent instruction; and triggering a dialogue between the selected smart digital agent and the user, wherein, the selected smart digital agent navigates a predefined issue workflow by analyzing audio input from the user and generating speech responses to the user, and the selected smart digital agent:

omits one or more portions of the predefined issue workflow based on the issue facts and/or the smart digital agent instructions provided to the smart digital agent via the live agent controls, and/or augments the predefined issue workflow with one or more additional portions based on the issue facts and/or the smart digital agent instructions provided to the smart digital agent via the live agent controls.

2. The method of claim 1, wherein the input, provided by the live agent used to generate the live agent controls, is provided by the live agent based at least in part on a live discussion with the user that is conducted prior to the triggered dialogue.

3. The method of claim 1, wherein, the predefined issue workflow comprises user or issue variables that the smart digital agent is configured to resolve via the dialogue;

the live agent controls comprise at least one issue fact that resolves at least one user or issue variable, and the smart digital agent is configured to:

omit a portion of the predefined issue workflow that corresponds to the at least one issue variable.

4. The method of claim 1, wherein, the predefined issue workflow comprises user or issue variables that the smart digital agent is configured to resolve via the dialogue;

the live agent controls comprise at least smart digital agent instruction that introduces a new user or issue variable, and the smart digital agent is configured to:

augment a portion of the predefined issue workflow to resolve the introduced new user or issue variable.

5. The method of claim 1, wherein the smart digital agent is configured to:

ingest the live agent controls;

compare the ingested live agent controls to the predefined issue workflow;

identify one or more portions of the predefined issue workflow based on the comparison; and perform one or more of:

omitting the identified one or more portions of the predefined issue workflow; or augmenting the identified one or more portions of the predefined issue workflow with one or more additional workflow portions.

6. The method of claim 5, wherein, the predefined workflow comprises a workflow structure with workflow states and workflow transitions, and navigating the predefined issue workflow by the smart digital agent comprises generating the speech responses by progressing through the workflow states according to the workflow transitions.

7. The method of claim 6, wherein the one or more portions of the predefined issue workflow identified based on the comparison comprise one or more states and one or more state transitions that match the live agent controls, and the smart digital agent is configured to perform one or more of:

omitting the one or more states and one or more state transitions that match the live agent controls; or augmenting the one or more states and one or more state transitions that match the live agent controls with one or more additional workflow portions.

8. The method of claim 5, wherein, the predefined workflow comprises a series of organized language prompts, and navigating the predefined issue workflow by the smart digital agent comprises providing the organized language prompts to a generative machine learning model to generate the speech responses.

9. The method of claim 8, wherein the one or more portions of the predefined issue workflow identified based on the comparison comprise one or more language prompts that match the live agent controls, and the smart digital agent is configured to perform one or more of:

omitting the or more language prompts that match the live agent controls; or augmenting the or more language prompts that match the live agent controls with additional language prompts.

10. The method of claim 1, further comprising:

receiving, during the triggered dialogue from a monitoring live agent, one or more real-time live agent controls; and generating, by the smart digital agent during the triggered dialogue, at least one speech response based on the real-time live agent controls.

11. The method of claim 1, further comprising:

receiving, during the triggered dialogue from a monitoring live agent, real-time live agent input that simulates audio input from the user; and generating, by the smart digital agent during the triggered dialogue, at least one speech response based on the simulated audio input from the user.

12. The method of claim 11, wherein the user is provided the real-time live agent input that simulates the audio input from the user, or the user is restricted from the real-time live agent input that simulates the audio input from the user.

13. The method of claim 1, further comprising:

calculating, during the triggered dialogue, a user satisfaction score based on a progress of navigating the predefined issue workflow and/or the user audio input; and prompting, when the user satisfaction score is below a threshold, a live agent monitoring the triggered dialogue to interrupt, wherein the smart digital agent is configured to pause or terminate navigating the predefined issue workflow when the live agent interrupts the dialogue.

14. The method of claim 1, further comprising:

after the triggered dialogue, triggering a follow-up dialogue between the user and another smart digital agent configured to navigate a predefined follow-up workflow, wherein the another smart digital agent is selected based on one or more follow-up actions associated with the triggered dialogue or the predefined issue workflow.

15. A non-transitory computer-readable storage medium storing instructions that, when executed by a computing system, cause the computing system to perform a process for configuring smart digital agent(s) for interactions over a user interaction lifecycle, the process comprising:

receiving, via interactions with a live agent, selections of one or more smart digital agents from among a plurality of smart digital agents for a user interaction, wherein the plurality of smart digital agents are categorized based on user issue types;

providing, based on input from the live agent, configuration data for the user interaction, wherein the configuration data comprises live agent controls with respect to one or more user issue types the selected smart digital agent is configured to resolve, the live agent controls comprising issue facts or smart digital agent instruction; and triggering a dialogue between the selected smart digital agent and the user, wherein, the selected smart digital agent navigates a predefined issue workflow by analyzing audio input from the user and generating speech responses to the user, and the selected smart digital agent:

omits one or more portions of the predefined issue workflow based on the issue facts and/or the smart digital agent instructions provided to the smart digital agent via the live agent controls, and/or augments the predefined issue workflow with one or more additional portions based on the issue facts and/or the smart digital agent instructions provided to the smart digital agent via the live agent controls.

16. The non-transitory computer-readable storage medium of claim 15, wherein, the predefined issue workflow comprises user or issue variables that the smart digital agent is configured to resolve via the dialogue;

the live agent controls comprise at least one issue fact that resolves at least one user or issue variable, and the smart digital agent is configured to:

omit a portion of the predefined issue workflow that corresponds to the at least one issue variable.

17. The non-transitory computer-readable storage medium of claim 15, wherein, the predefined issue workflow comprises user or issue variables that the smart digital agent is configured to resolve via the dialogue;

the live agent controls comprise at least smart digital agent instruction that introduces a new user or issue variable, and the smart digital agent is configured to:

augment a portion of the predefined issue workflow to resolve the introduced new user or issue variable.

18. The non-transitory computer-readable storage medium of claim 15, wherein the process further comprises:

receiving, during the triggered dialogue from a monitoring live agent, one or more real-time live agent controls; and generating, by the smart digital agent during the triggered dialogue, at least one speech response based on the real-time live agent controls.

19. The non-transitory computer-readable storage medium of claim 15, wherein the process further comprises:

receiving, during the triggered dialogue from a monitoring live agent, real-time live agent input that simulates audio input from the user; and generating, by the smart digital agent during the triggered dialogue, at least one speech response based on the simulated audio input from the user.

20. A computing system for configuring smart digital agent(s) for interactions over a user interaction lifecycle, the computing system comprising:

one or more processors; and one or more memories storing instructions that, when executed by the one or more processors, cause the computing system to perform a process comprising:

receiving, via interactions with a live agent, selections of one or more smart digital agents from among a plurality of smart digital agents for a user interaction, wherein the plurality of smart digital agents are categorized based on user issue types;

providing, based on input from the live agent, configuration data for the user interaction, wherein the configuration data comprises live agent controls with respect to one or more user issue types the selected smart digital agent is configured to resolve, the live agent controls comprising issue facts or smart digital agent instruction; and triggering a dialogue between the selected smart digital agent and the user, wherein, the selected smart digital agent navigates a predefined issue workflow by analyzing audio input from the user and generating speech responses to the user, and the selected smart digital agent:

omits one or more portions of the predefined issue workflow based on the issue facts and/or the smart digital agent instructions provided to the smart digital agent via the live agent controls, and/or augments the predefined issue workflow with one or more additional portions based on the issue facts and/or the smart digital agent instructions provided to the smart digital agent via the live agent controls.

* * * * *